United States Patent [19]
Carroll

[11] Patent Number: 5,259,656
[45] Date of Patent: Nov. 9, 1993

[54] GOLF CART ENCLOSURE

[76] Inventor: Larry W. Carroll, 2604 Tampa East Blvd., Tampa, Fla. 33619

[21] Appl. No.: 989,883

[22] Filed: Dec. 14, 1992

Related U.S. Application Data

[63] Continuation of Ser. No. 830,293, Jan. 31, 1992, abandoned.

[51] Int. Cl.$^5$ .............................................. B60J 9/00
[52] U.S. Cl. ...................... 296/77.1; 296/79; 296/83; 296/98; 296/102; 296/135; 296/141; 280/DIG. 5; 160/25; 160/237; 160/DIG. 18; 150/159
[58] Field of Search ............... 296/77.1, 80, 79, 83, 296/102, 136, 140, 141, 99.1, 98, 1, 135, 138; 150/159, 160, 168; 280/DIG. 5; 160/23.1, 25, 29, 237, DIG. 18

[56] References Cited

U.S. PATENT DOCUMENTS

| | | | |
|---|---|---|---|
| 258,831 | 5/1882 | Weaver | 296/138 |
| 479,910 | 8/1892 | Lugenbell | 296/138 |
| 535,002 | 3/1895 | Haberling | 296/138 |
| 1,219,735 | 3/1917 | Harvey | 296/136 |
| 1,470,454 | 10/1923 | Landeweer et al. | 296/140 |
| 1,472,651 | 10/1923 | Holling | 296/138 |
| 1,568,712 | 1/1926 | Bishop | 296/140 |
| 1,944,053 | 1/1934 | Zied | 296/99.1 |
| 2,256,890 | 9/1941 | Brown et al. | 296/80 |
| 2,539,951 | 1/1951 | Hall | 296/77.1 X |
| 2,688,513 | 9/1954 | Poirier | 296/98 |
| 3,709,553 | 1/1973 | Churchill et al. | 296/190 |
| 4,098,536 | 7/1978 | Mills | 296/77.1 |
| 4,544,195 | 10/1985 | Gunn | 160/DIG. 18 |
| 4,621,859 | 11/1986 | Spicher | 296/77.1 |
| 4,652,037 | 3/1987 | Thau et al. | 296/77.1 |
| 4,773,694 | 9/1988 | Gerber | 296/77.1 |
| 4,795,205 | 1/1989 | Gerber | 296/77.1 |

FOREIGN PATENT DOCUMENTS

| | | | |
|---|---|---|---|
| 4007 | 9/1931 | Australia | 296/138 |
| 69003 | 11/1975 | Australia | 296/136 |
| 1177831 | 4/1959 | France | 296/98 |
| 97524 | 6/1983 | Japan | 296/136 |

Primary Examiner—Dennis H. Pedder
Attorney, Agent, or Firm—Edward M. Livingston

[57] ABSTRACT

A new golf cart enclosure has a top panel (14) with roll cover (5) attachable to a top (13) of a golf cart (4) or other vehicle or structure (32) above an area to be enclosed. Roll-up side panels (1-3 and 37) made of flexible and selectively transparent materials are attachable to the top of the golf cart (4) or structure at a position under the roll cover (5). This allows the roll-up side panels (18) to be rolled up under the roll cover (5) at select sides of the golf cart or structure to protect the transparent panels (1-3 and 37) from sun and other elements. The roll-up side panels in rolled-up condition are then held in a position under the roll cover with straps (20). The roll cover (5) can be positioned on top of the golf cart (4) or structure (32) such that the roll cover (5) has a plurality of edges at a plurality of sides of the golf cart or structure. The roll cover overhangs edges of the golf cart or structure and overlies rolled-up side panels (18) like flexible eaves. The side panels (1-3 and 37) can be provided with vertical zippers (9) for fastening the side panels together. Flexible windows (10, 11 and 35) can be provided with zippered edges (9) or other fasteners. In addition to a new roll cover, this cart enclosure also provides a new material-saving and easy fastening windshield attachment panel (28) and appendages (29) which can also be used with other golf cart enclosures as well.

28 Claims, 4 Drawing Sheets

GOLF CART ENCLOSURE

CROSS-REFERENCE TO RELATED APPLICATION

This is a continuation of application Ser. No. 07/830,293, filed Jan. 31, 1992, now abandoned.

BACKGROUND OF THE INVENTION

This invention relates to weather-protective covers for golf carts, for various types of open-sided vehicles, for industrial fork lifts and for stationary enclosures. In particular, it relates to a roll-up enclosure with a cover extendable over sides of the enclosure in rolled-up codition for protection against sunlight, run-off moisture, dirt particles and damage from external objects. In addition, the cover is also convenient to use as an aesthetic protection for rolled-up sides of the enclosure.

Previously, roll-up enclosures have left rolled-up sides exposed to weather, to damage from external objects and in plain view with a messy appearance. Descriptive of pertinent prior art are the following patent documents:

| NUMBER | DATE | NAME | CLASSIFICATION |
| --- | --- | --- | --- |
| 4,773,694 | Sept. 27, 1988 | Gerber | 296/77.1 |
| 4,652,037 | March 24, 1987 | Thau, et al. | 296/78 R |
| 4,621,859 | Nov. 11, 1986 | Spicher | 296/78 R |
| 3,709,553 | Jan. 9, 1973 | Churchill, et al. | 296/28 C |

The Gerber patent taught a flexible golf-cart roof with hanging side panels that could be rolled up and held in a rolled-up condition with straps at edges of the flexible roof. Problems, however, are that the rolled-up side panels were left exposed. Sunlight caused them to deteriorate and discolor. Leaves, dirt, tree bark blowing in windy rain and bird-droppings landed on the rolled-up panels with unpleasant effects. Precipitation gathered on them and in the rolls, later dropping on passengers getting in and out of the golf cart. Passengers also tended to hold onto the rolls with unpleasant effects when getting in and out of golf carts. Also, the rolls drooped in an untidy form that caused golf carts to look messy. Furthermore, the Gerber device uses a pocket-like windshield attachment which often droops during use.

Different from the Gerber device, however, this invention covers rolled-up panels in a manner that prevents all of these problems.

The Thau patent described a protective cover with some differences from the Gerber patent that related to a fork-lift truck. It had the same problems as the Gerber device. They have been solved similarly by this invention.

The Spicher device appeared similar but was different in that it had hinged sides rather than roll-up panels.

The Churchill, et al. patent described side panels that rolled from side-to-side of entrances rather than up-and-down as provided by this invention and the Gerber device. Hence, the problems as well as the device were different.

Numerous other prior-art devices are not sufficiently similar for comparison.

SUMMARY OF THE INVENTION

One object of this invention is to provide a roll-up enclosure with a cover that protects rolled-up side panels from exposure to ultraviolet sun rays, extraneous particles, bird-droppings, and objects carried in wind and rain.

Another object of this invention is to provide a roll-up enclosure with a cover that protects against accumulation of rain in rolled-up side panels.

Another object of this invention is to provide a roll-up enclosure with a cover that is convenient to use for holding up rolled side panels.

Another object of this invention is to provide a roll-up enclosure with a cover that prevents people from grabbing onto the rolls as hand rests.

Another object of this invention is to provide a roll-up enclosure having even roof lines instead of droopy rolls at tops of the enclosure.

An additional object of the present invention is to provide a golf cart enclosure with a new windshield attachment that is easy to manufacture, saves material, easy to use and more aesthetic.

Yet another objective of this invention is to provide a roll-up enclosure that can be custom-tailored to fit and then attach conveniently to a wide variety of vehicles and areas to be enclosed.

This invention accomplishes the above and other objectives with a roll-up golf-cart enclosure having a roll cover attachable to a top of a golf cart or other vehicle or structure above an area to be enclosed. Roll-up side panels made of flexible and selectively transparent material are attachable to the top of the golf cart or structure at a position under the roll cover. This allows the roll-up side panels to be rolled up under a roll cover at select sides of the golf cart or structure. The roll-up side panels in rolled-up condition are then held in a position under the roll cover with straps or other tying means. The roll cover can be positioned on top of the golf cart or structure such that the roll cover has a plurality of edges at a plurality of sides of the golf cart or structure. The roll cover overhangs edges of the golf cart or structure and overlies rolled-up side panels like flexible eaves. The side panels can be provided with vertical zippers or other means for fastening the side panels together. Flexible windows can be provided with zippered edges or other fastener means. Additionally, a new windshield attachment panel using snaps or other fastening means is provided.

BRIEF DESCRIPTION OF THE DRAWINGS

This invention is described by appended claims in relation to description of a preferred embodiment with reference to the following drawings wherein:

DESCRIPTION OF PREFERRED EMBODIMENTS

Figure 1:
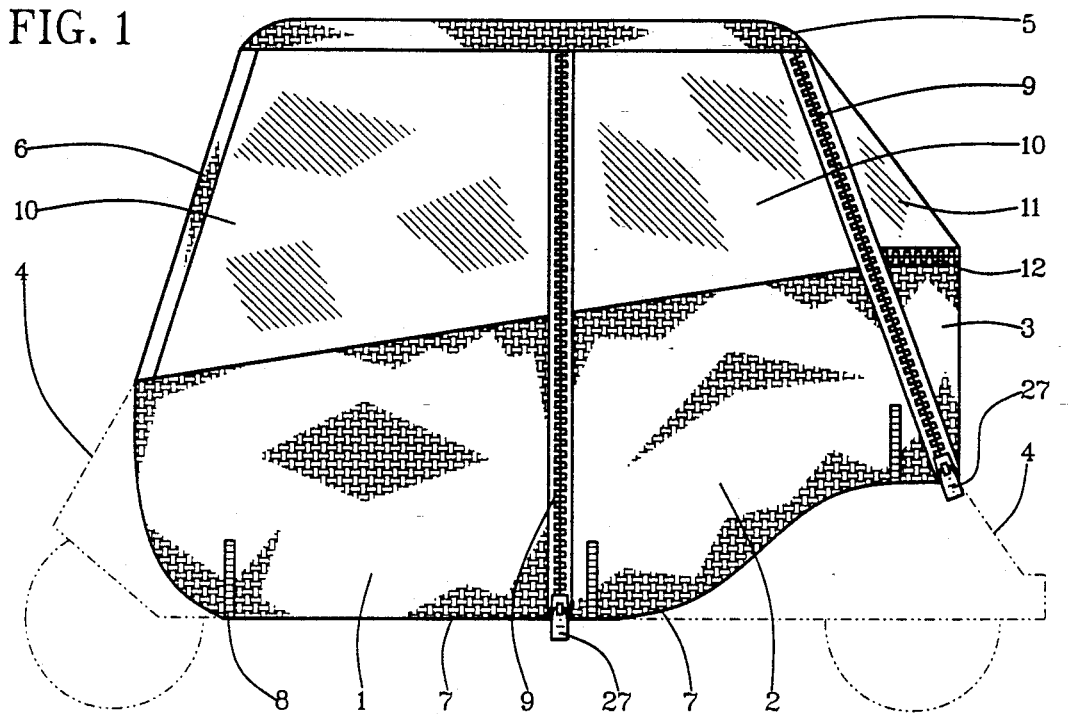
FIG. 1 is a side elevation view of this invention fitted on a golf cart.

Referring to FIG. 1 a front-side roll-up panel 1, and a back-side roll-up panel 2 are sized and shaped to fit sides of and a rear roll-up panel 3 is sized and shaped to fit a rear of an enclosure such as a golf cart 4. The roll-up panels 1-3 are then sewed or otherwise attached to a bottom side 38 of a top panel 14 with a roll cover 5 which is positional over an enclosure such as the golf cart 4.

A leading edge 6 of the front-side roll-up panel 1 can be attachable to a portion of an enclosure such as a windshield of the golf cart 4. Panel bottom edges 7 can be attached to bottom portions of an enclosure such as the golf cart 4 with attachment straps 8. The roll-up panels 1-3 can be attached to each other by means of vertical zippers 9.

The roll-up panels 1-3 can have side windows 10 and rear window 11 that are rollable with panels 1-3. The windows can be fitted with horizontal zippers 12 such as illustrated for rear window 11. The purpose of the horizontal zipper 12 on rear window 11 for golf-cart embodiments of this invention is to provide access to golf bags from the rear of the golf cart 4.

An enclosure formed by this invention can be on all sides or part of the sides of an area to be enclosed. It can have a structural relationship to an existing enclosure. A golf cart, for example, is referred to generally as having an enclosure even though normally only a top of a windshield are covered. Framework pillars of a golf cart and some types of structures are considered semantically to form a type of enclosure. An enclosure, therefore can be something less than a hermetically sealed volume. This invention is used in relationship to relatively broad interpretations of enclosure.

Figure 2:
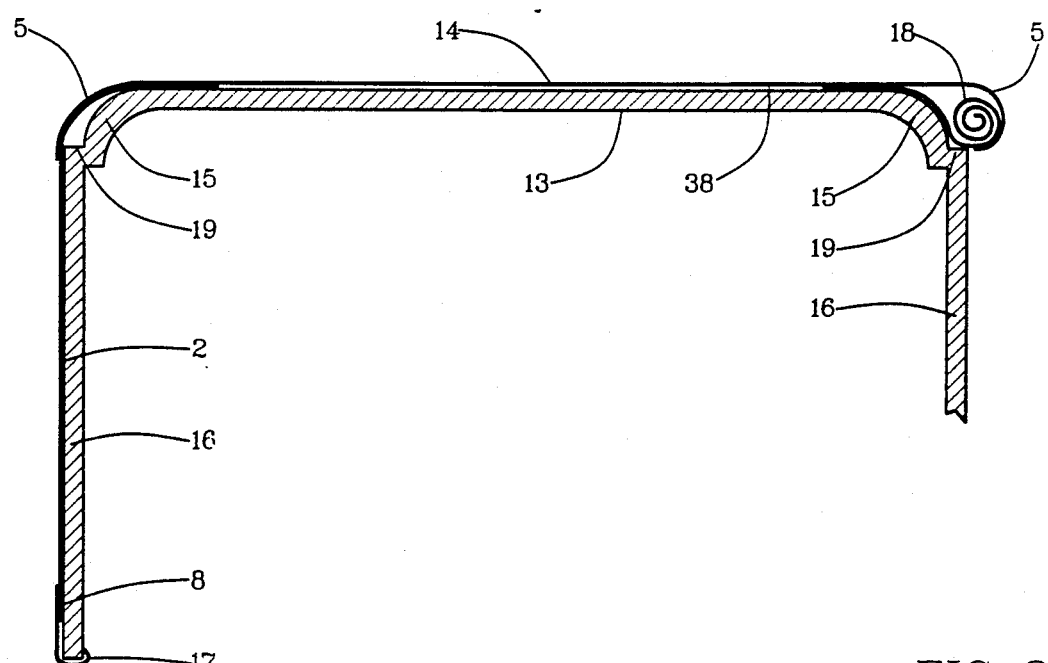
FIG. 2 is a cutaway cross-sectional view of the invention rolled up at one side and in an un-rolled or suspended condition at an opposite side of a framework representative of a vehicle or other enclosure.

Referring to FIG. 2, a plurality of roll covers 5 can be joined at opposite sides of an enclosure roof member 13 by a top panel 14. Alternatively, the roll covers 5 and the roll-up panels 1-3 can be attached to roof-member edges 15. In this illustration, a back-side roll-up panel 2 at the left of FIG. 2 is shown suspended and hooked to a bottom of a framework side 16. An attachment strap 8 is provided with an attachment hook 17 as an optional means of securing the roll-up panel 2 at a bottom edge. The attachment strap 8 can be adjustable and resilient as desired. The hook 17 is representative of other fastener means that can be employed.

When the roll-up panel 2 at the right is rolled up, it is covered by roll cover 5. This covering feature provides multiple advantages. It remains clean as dirt, leaves, tree bark and other debris carried by wind and rain don't accumulate on the rolls. Bird droppings do not collect on rolled-up panels 18 where hands are used to roll them. The roll-up panels and their plastic rollable windows are protected from sunlight that deteriorates them or causes them to crack in a rolled condition. The covers also provide a neat appearance in contrast to the droopy appearance of rolls without this cover 5. The rolled-up panels 18 can rest on vehicle roof gutters 19 if there are any for the particular golf cart or other vehicle on which this invention is used.

The roll-up panels 1-3 and the windows 10 and 11 can be made of a flexible plastic material. The top panel 14 also can be made of material having similar characteristics. Alternatively, a woven material can be used for the roll-up panels 1-3 and for the top panel 14. The roll-up panels 1-3 can be referred to generaly as including window sections, leading edge 6, zippers 9 and 12, the straps 8 and other portions of roll-up panel assemblies.

Figure 3:
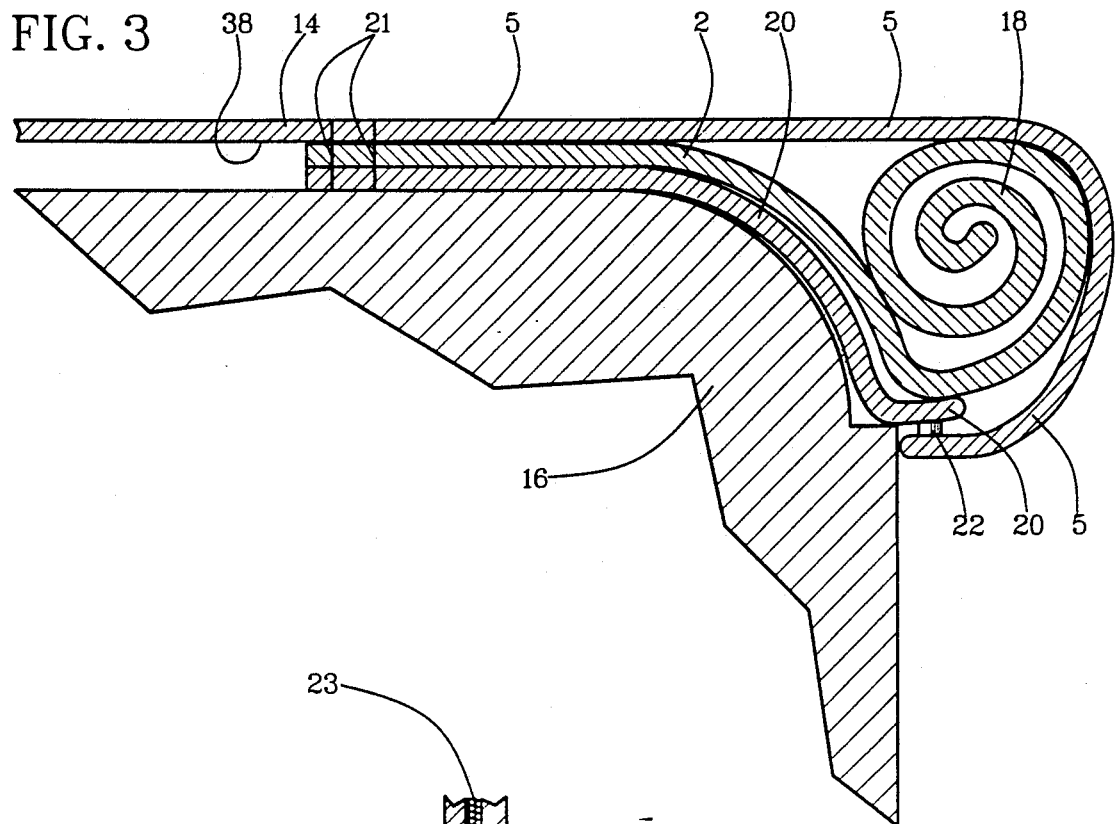
FIG. 3 is an enlarged cross-sectional view of a rolled-up section showing greater detail.

Referring to FIG. 3, a roof strap 20 and either of the roll-up panels 1-3, represented by back-side roll-up panel 2, are attached to the roll cover 5 and to the top panel 14 proximate to the top of the roll-up panel 2 by parallel stitching 21 and positioned on a framework 16. The roof strap 20 and the roll cover 5 are provided with a roll fastener 22 which is engaged when the rolled-up panel 18 is positioned under the roll cover 5. There can be a plurality of roof straps 20 and they can be selectively wide to prevent the rolled-up panel 18 from sagging below the roll cover 5.

Figure 4:
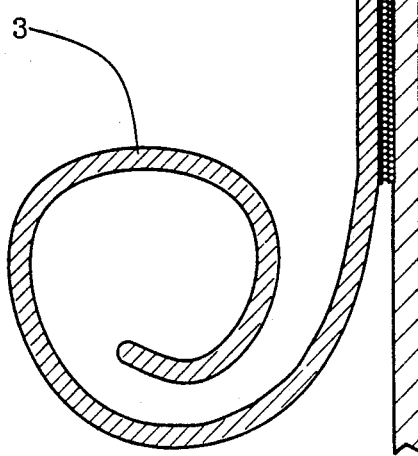
FIG. 4 is another enlarged cross-sectional view of a roll-up panel attachable to a frame member with conventional plastic-hook sheets such as Velcro hook and loop fastening material.

Referring to FIG. 4, any edge of a roll-up panels 1-3 can be secured to a framework side by means of conventional plastic attachment strips 23 on surfaces to be joined. For a golf cart 4 and vehicles having similar characteristics, it is preferable that a leading side 6 of front-side roll-up panel 1 be attachable to windshield framework 24.

Figure 5:
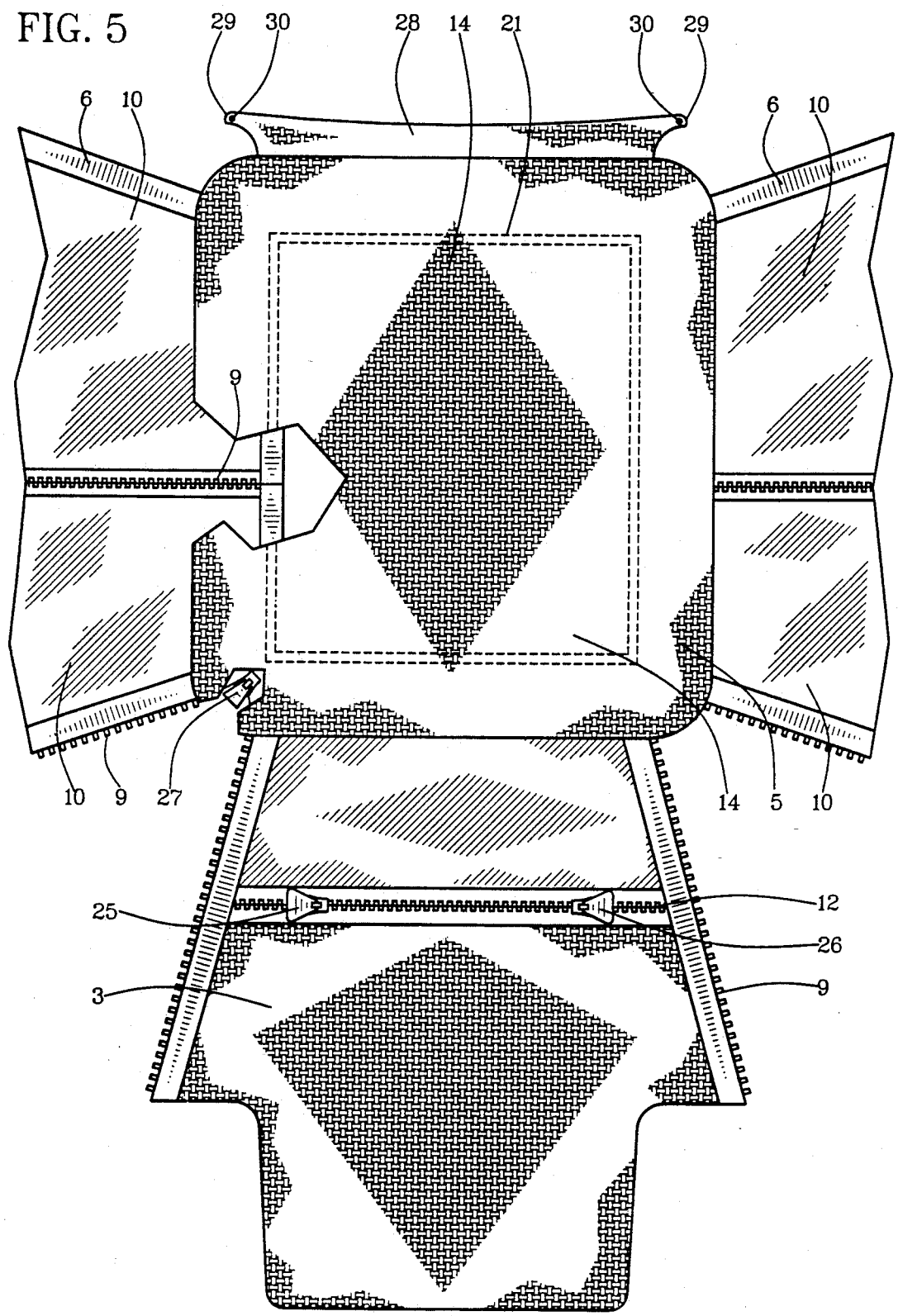
FIG. 5 is a cutaway top view of the FIG. 1 embodiment showing a back section and a front section extended in a plane with the top section.

Referring to FIG. 5, a rear roll-up panel 3 is extended horizontally from a top panel 14. A horizontal zipper 12 can have a left zipper guide 25 and a right zipper guide 26. The zipper guides 25 and 26 can be a two-way type which causes them to close the zipper 12 when pulled in directions toward each other. This allows access to either of two golf bags or to a variety of items which can be carried in a back section of the golf cart 4. Panel zipper guides 27, however, are preferably a one-way type that open the vertical zippers 9 when in an up position as shown. In FIG. 1, the vertical zippers 9 are shown in a closed position with the panel zipper guides 27 in a down position. A horizontal zipper 12 and either two-way zipper guides 25 and 26, or a one-way zipper guide 27 can be employed for optional zipper-operable windows in place of the side windows 10 for various types enclosures with this invention.

A windshield-attachment panel 28 can be secured to the top panel 14 similar to the manner in which panels 1-3 are attached by such means as parallel stitching 21. Windshield-attachment appendages 29 can be sized and shaped to wrap around various shapes and sizes of structural members. Fasteners 30 can be positioned on the appendages 29 and used with or without various straps or other fastener members as desirable for different types of vehicle windshields. One advantage to this windshield-attachment panel 28 is that it prevents wind and moisture from entering through the front top of a golf cart or other enclosure, a problem which is common with golf cart enclosures in the prior art.

In place of this windshield-attachment panel 28, a fourth side of an enclosure can be provided with roll-up panels similar in principle but sized and shaped differently for differnt types of enclosures with which this invention can be used. The enclosure can have any number of roll-up panels. There can be one or more than one roll-up panel to a side of the enclosure as illustrated for this particular application. Any number of sides of an enclosure can be provided by a structure on which this invention is used, provided this invention is used for at least one of the sides.

The zippers 9 and 12 and the zipper guides 26-27 are shown in blown-up proportions to demonstrate their working relationship to the rest of the invention.

Figure 6:
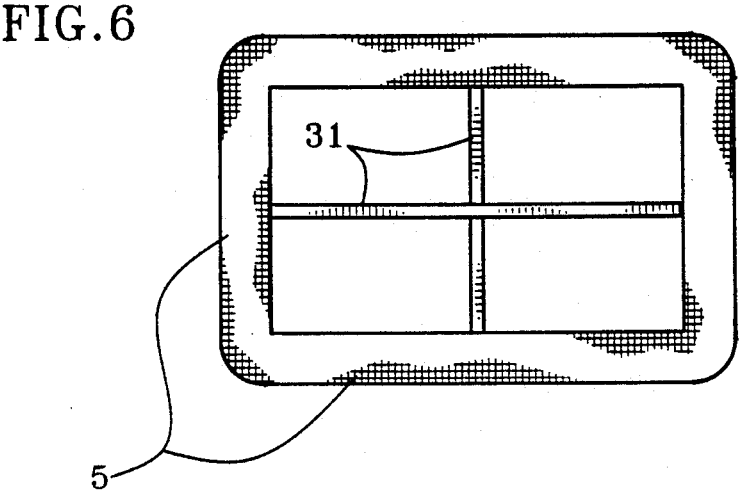
FIG. 6 is a top view of an embodiment having sides and ends joined by extensions.

Referring to FIG. 6, opposite sides of the roll cover 5 can be joined by roll-cover extensions 31 instead of being joined by a top panel 14. This allows for adaptability to various types of enclosure tops.

Figure 7:
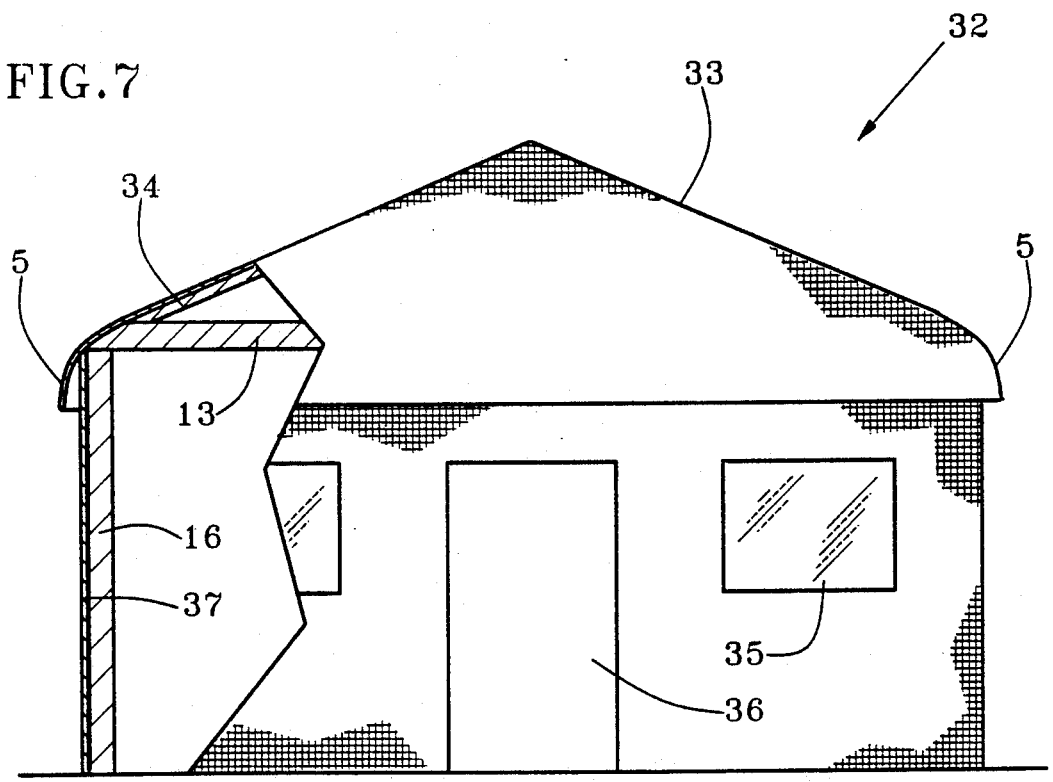
FIG. 7 is a cutaway elevation view of an embodiment of this invention in relationship to framework of a temporary building.

Referring to FIG. 7, a stationary enclosure 32 can be provided with a top panel in the form of a roof 33. All of the structural relationships of parts can be the same as for a golf cart or for various other forms of vehicles. The roof 33 can be supported by roof support member 34 at appropriate positions or in a center the same as for enclosure roof member 13. Framework side 16 also can be similar for both stationary and mobile enclosures. Openings such as windows 35 and door 36 can have the same working relationship as for other enclosures. In either and all these embodiments of this invention, the roll-up panels 1-3 or stationary-enclosure roll-up panel 37 have the same working relationships and the same advantages of roll covers 5 covering rolled up panels 18 shown in FIGS. 2 and 3 for the same advantages.

A new and useful enclosure for golf carts, vehicles and other structures with novel roll-up panels and attachments having been described, all such modifications, adaptations, substitutions of equivalents, applications and forms thereof as described by the following claims are included in this invention.

I claim:

1. A roll-up panel enclosure for covering a structure having a roof and framework, said enclosure comprising:
   a plurality of roll-up panels forming a select enclosure;
   a top panel, which extends beyond a periphery of the roof, to which a top end of each of the roll-up panels are attached at a location sufficiently inward to a bottom side of the top panel to form a roll cover on the top panel which overlaps the roll-up panels and stows the roll-up panels substantially outside the periphery of the roof when in a rolled-up condition; and
   a means for containing the roll-up panels in a rolled-up position under the roll cover, said means being located between the respective roll-up panels and the roof and being attached at the same location as the top end of each of the roll-up panels.

2. An enclosure according to claim 1 wherein the top of each roll-up panel is sewed to the bottom side of the top panel.

3. An enclosure according to claim 1 wherein the means for containing the roll-up panels in a rolled-up condition under the roll cover is a plurality of straps extendible to a fastener means for each strap proximate an outside edge of the top panel.

4. An enclosure according to claim 1 and further comprising means for attachment of roll-up panels to each other.

5. An enclosure according to claim 4 wherein the means for attachment of roll-up panels to each other is a zipper at joining edges of the roll-up panels.

6. An enclosure according to claim 1 and further comprising flexible windows in the roll-up panels.

7. An enclosure according to claim 1 wherein the roll-up panels are sized and shaped to fit a particular enclosure roof and the roll cover is sized and shaped to fit the same enclosure roof.

8. An enclosure according to claim 7 wherein the particular enclosure roof is a golf-cart roof.

9. An enclosure according to claim 8 wherein the roll cover is extendible from areas of attachment of the roll-up panels to the bottom side of the roll cover over a top of the golf-cart roof.

10. An enclosure according to claim 1 and further comprising an access opening in at least one of the roll-up panels.

11. An enclosure according to claim 10 wherein the access opening is a horizontal slit for access to golf bags on a golf cart through a rear roll-up panel and further comprising:
    zipper means in zipper-attachment relationship to opposite sides of the horizontal slit; and
    zipper closure means at opposite ends of the horizontal slit such that the horizontal slit provides an access opening that is accessible from both ends of the horizontal slit for access to the golf bags.

12. An enclosure according to claim 1 and further comprising a means for attachment of a bottom end of the roll-up panels to a bottom frame of an enclosure.

13. A roll-up panel enclosure for covering a golf cart having a roof and framework, said enclosure comprising:
    a plurality of roll-up panels sized and shaped to form a golf cart enclosure around an outside periphery of a golf cart;
    a top panel, which extends beyond a periphery of the roof of the golf cart, to which a top end of each of the roll-up panels are attached at a location sufficiently inward to a bottom side of the top panel to form a roll cover on the top panel which overlaps the roll-up panels and stows the roll-up panels substantially outside the periphery of the roof when in a rolled-up condition; and
    means for containing the roll-up panels in a rolled-up condition under the roll cover, said means being located between the respective roll-up panels and the roof and being attached at the same location as the top end of each of the roll-up panels.

14. An enclosure according to claim 13 wherein the top of each roll-up panel is sewed to the bottom side of the roll cover.

15. An enclosure according to claim 13 wherein the means for containing the roll-up panels in a rolled-up condition under the roll cover of the top panel is a plurality of straps attached to the bottom side of the roll cover and extendible to a fastener means for each strap proximate an outside edge of the roll cover.

16. An enclosure according to claim 13 and further comprising means for attachment of roll-up panels to each other.

17. An enclosure according to claim 16 wherein the means for attachment of roll-up panels to each other is a zipper at joining edges of the roll-up panels.

18. An enclosure according to claim 13 and further comprising flexible windows in the roll-up panels.

19. An enclosure according to claim 13 and further comprising an access opening in at least one of the roll-up panels.

20. An enclosure according to claim 19 wherein the access opening is a horizontal slit for access to golf bags on the golf cart through a rear roll-up panel and further comprising:
    zipper means in zipper-attachment relationship to opposite sides of the horizontal slit; and
    zipper closure means at opposite ends of the horizontal slit such that the horizontal slit provides an acccess opening that is accessible from both ends of the horizontal slit for access to the golf bags.

21. An enclosure according to claim 13 and further comprising a means for attachment of a bottom end of the roll-up panels to a bottom frame of the golf cart.

22. An enclosure according to claim 21 wherein the means for attachment of a bottom end of the roll-up panels to a bottom frame of a golf cart is a plurality of adjustable-length straps extended from a bottom end of the roll-up panels and having a frame hook attachable to an end of each adjustable-length strap.

23. An enclosure according to claim 21 wherein the means for attachment of a bottom end of the roll-up panels to a bottom frame of a golf cart is a plurality of resilient straps extended from bottom edges of the roll-up panels and having a frame hook attachable to an end of each resilient strap.

24. An enclosure according to claim 13 and further comprising a means for attachment of a front of the enclosure to a windshield frame of the golf cart.

25. An enclosure according to claim 24 wherein the means for attachment of a front of the enclosure to a windshield frame of the golf cart is a plurality of quick-disconnect fasteners attachable to the windshield frame and matching quick-disconnect fastner members attached to a top panel.

26. An enclosure according to claim 24 wherein the means for attachment of a front of the enclosure to a windshield frame of the golf cart is a plastic fastener sheet attachable to the windshield frame and a matching plastic fastener sheet attached to the front panel such that there is a face-to-face fastener relationship between the plastic fastener sheet attachable to the windshield frame and the plastic fastener sheet attached to the front panel.

27. An enclosure roll-up-panel for covering a structure having a roof and framework, said panel comprising:

a roll cover attached to the roof and which extends beyond a periphery of the roof to which a top end of the roll-up panel is attached at a location sufficiently inward to a bottom side of the roll cover so the roll cover overlaps the roll-up panels and stows the roll-up panels substantially outside the periphery of the roof when in a rolled-up condition; and a means for containing the roll-up panel in a rolled-up condition under the roll cover, said means being located between the respective roll-up panels and the roof and being attached at the same location as the top end of each of the roll-up panels.

28. An enclosure panel according to claim 27 wherein the means for containing the roll-up panel in a rolled-up condition under the roll cover is a plurality of straps attachable to the bottom side of the roll cover at a position proximate attachment of the top ends of the roll-up panels to the bottom side of the roll cover and extendible to a fastener means for each strap proximate an outside edge of the roll cover.

* * * * *